April 21, 1964   S. B. PINKERTON   3,129,662
TEST DEVICE
Filed Nov. 15, 1961   7 Sheets-Sheet 1

April 21, 1964 S. B. PINKERTON 3,129,662
TEST DEVICE
Filed Nov. 15, 1961 7 Sheets-Sheet 2
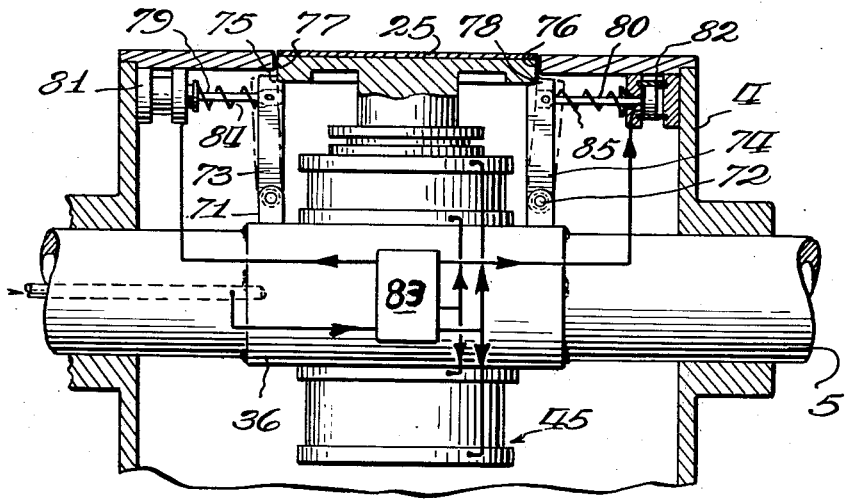
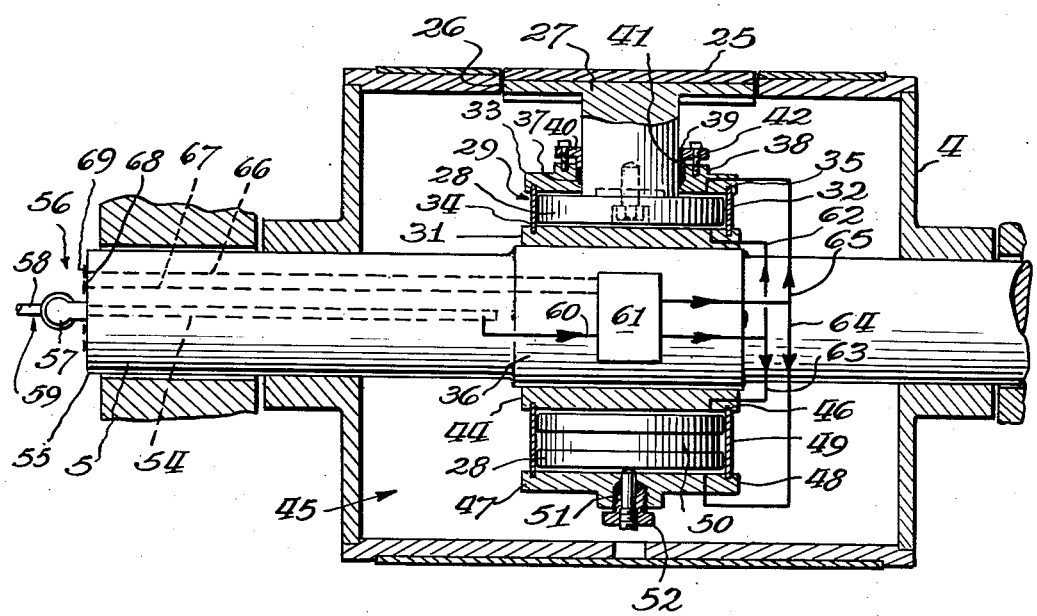

April 21, 1964 S. B. PINKERTON 3,129,662
TEST DEVICE
Filed Nov. 15, 1961 7 Sheets-Sheet 3
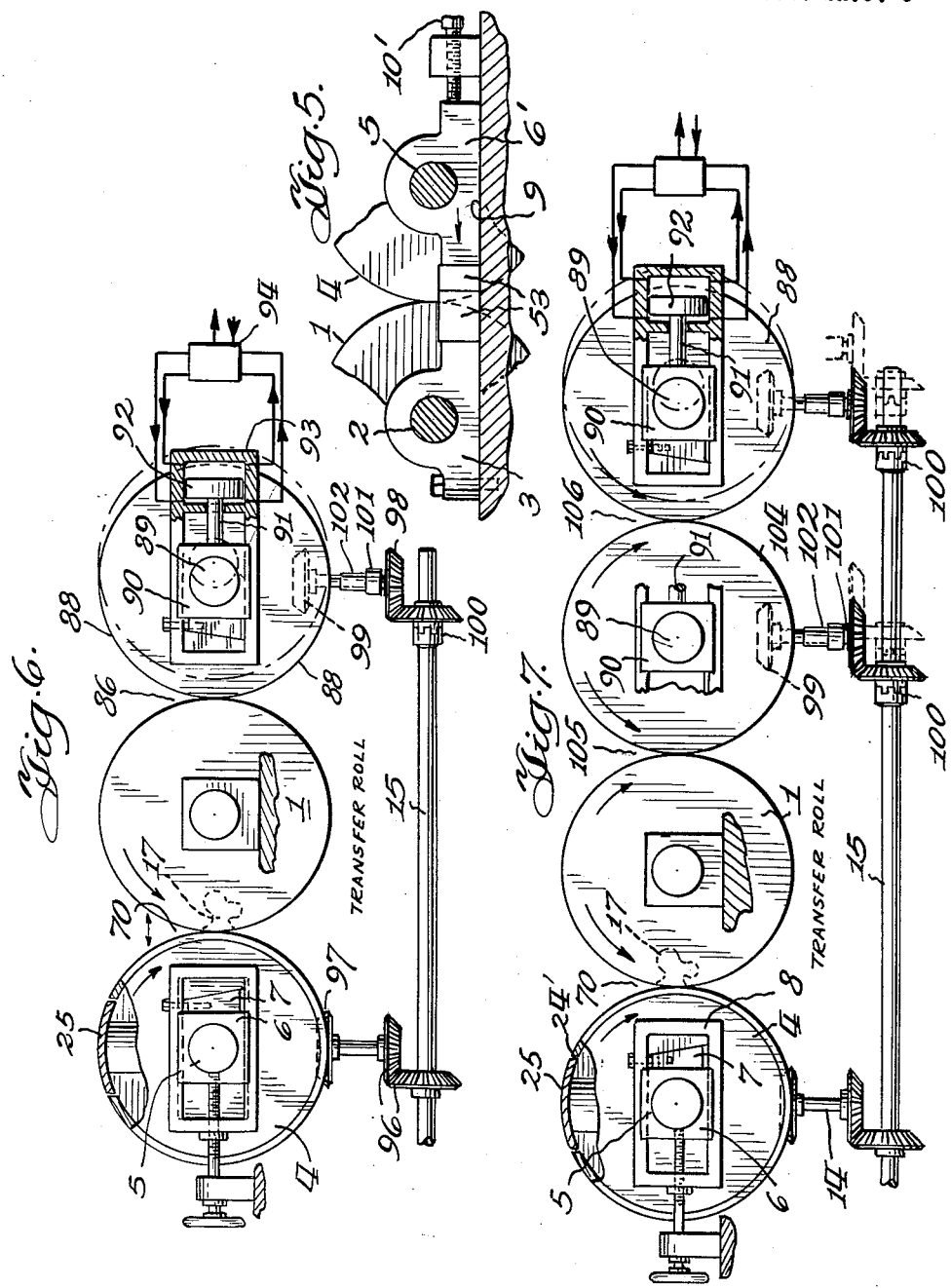

April 21, 1964 S. B. PINKERTON 3,129,662
TEST DEVICE
Filed Nov. 15, 1961 7 Sheets-Sheet 4

April 21, 1964  S. B. PINKERTON  3,129,662
TEST DEVICE
Filed Nov. 15, 1961  7 Sheets-Sheet 5
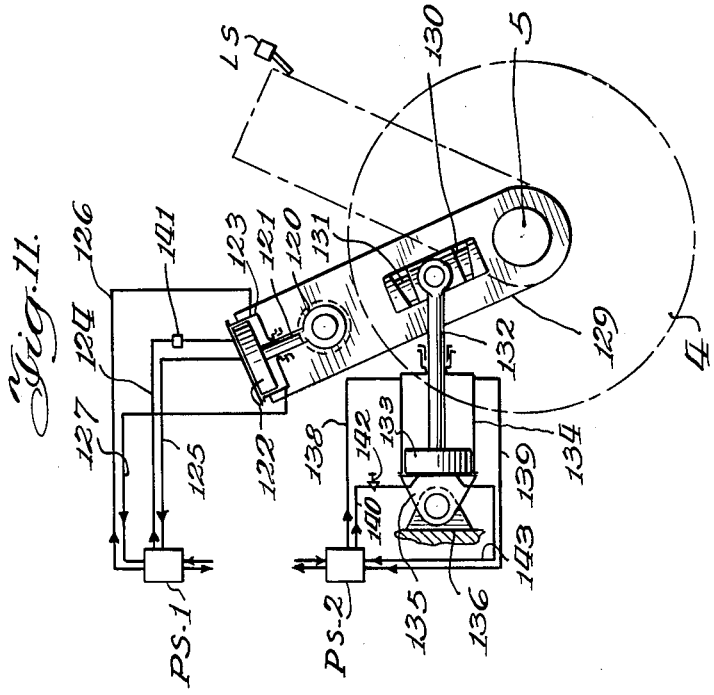
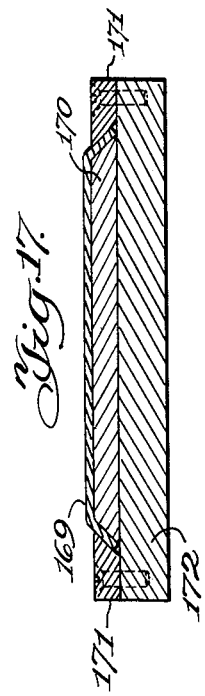
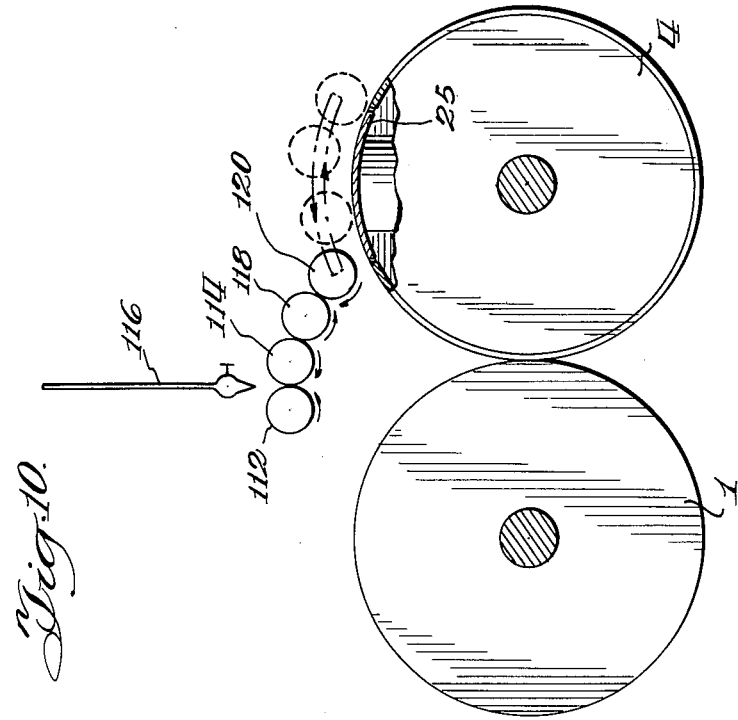

April 21, 1964  S. B. PINKERTON  3,129,662
TEST DEVICE
Filed Nov. 15, 1961  7 Sheets-Sheet 6
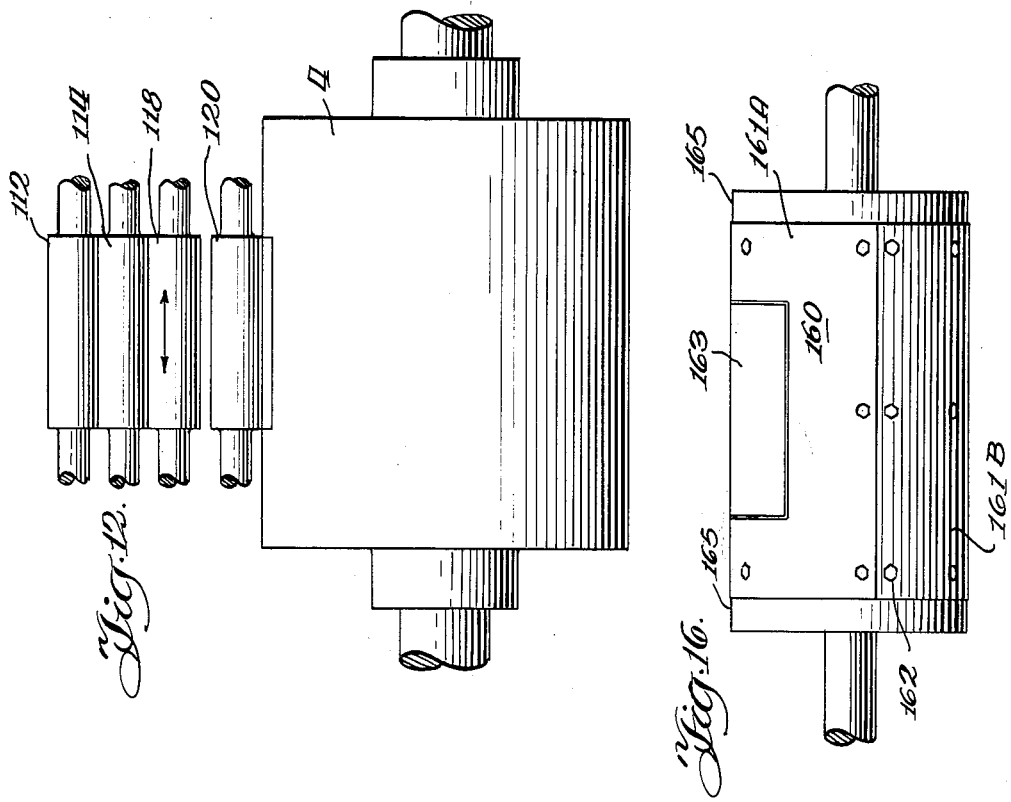
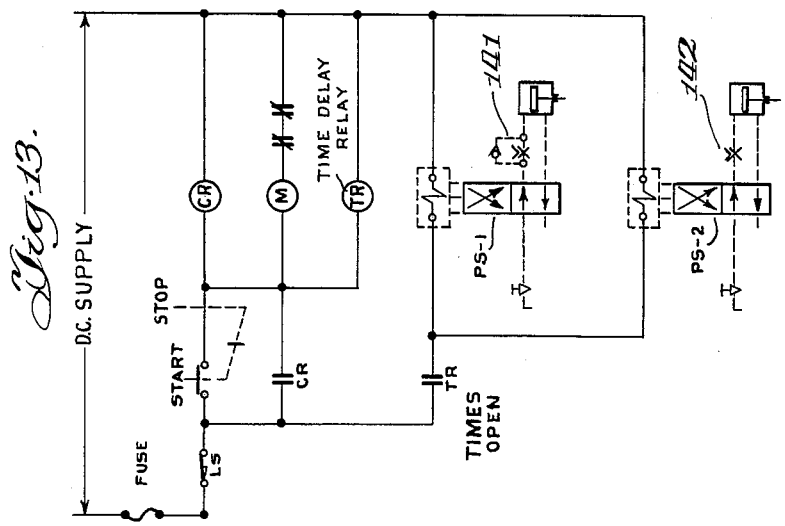

April 21, 1964  S. B. PINKERTON  3,129,662
TEST DEVICE
Filed Nov. 15, 1961  7 Sheets-Sheet 7
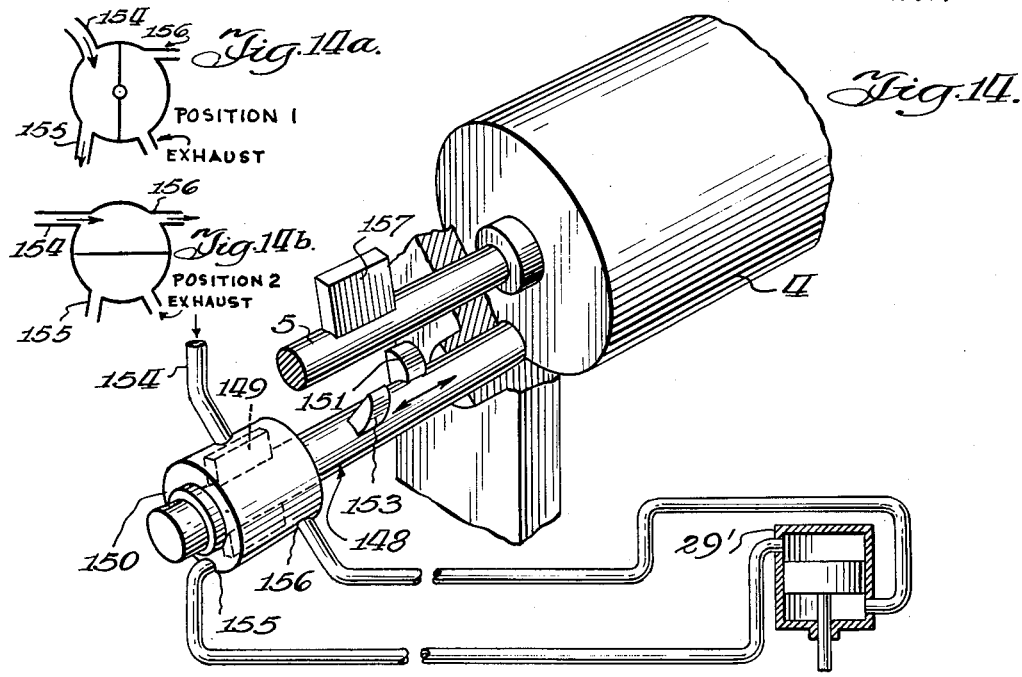
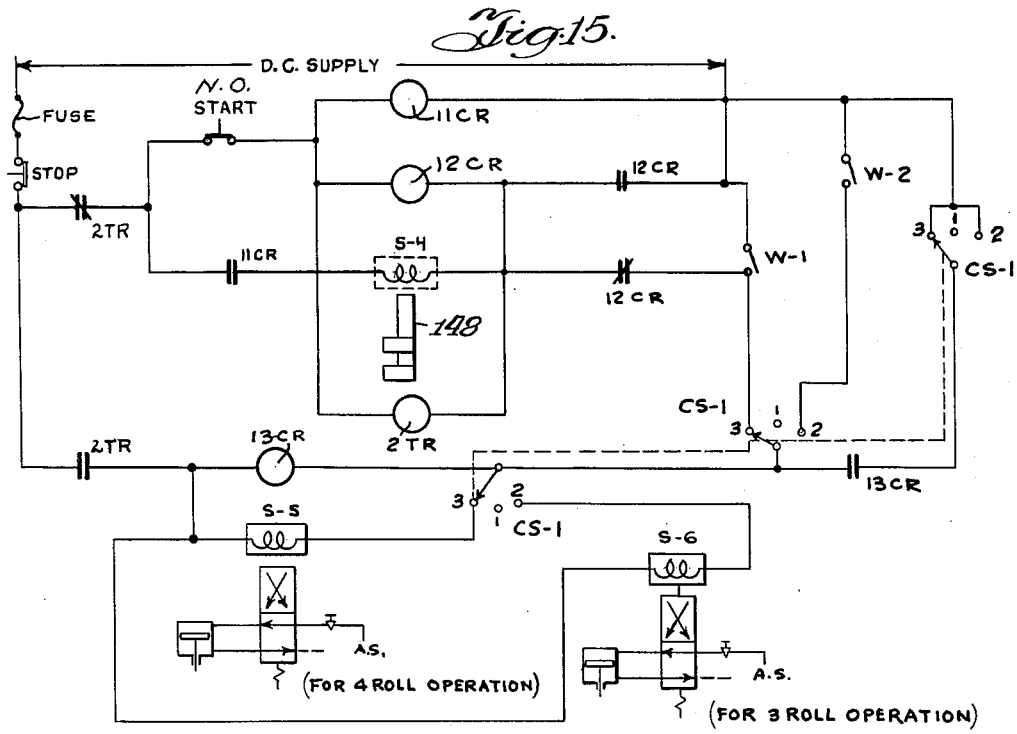

United States Patent Office 3,129,662
Patented Apr. 21, 1964

3,129,662
TEST DEVICE
Sanford B. Pinkerton, Sylacauga, Ala., assignor, by mesne assignments, to Kimberly-Clark Company, Neenah, Wis., a corporation of Wisconsin
Filed Nov. 15, 1961, Ser. No. 152,504
6 Claims. (Cl. 101—218)

This invention relates to rotary printing and is particularly directed to a test device and a method which employs intermittent sheet printing for effecting duplication of dynamic variables encountered in web fed rotary printing operations.

A primary object of the invention is to provide a sheet printing device which is adapted so that individual variable aspects of a production operation or a combination of variables may be readily, accurately, and quickly examined and appropriately related to production conditions.

An important object of the present invention is to provide a novel method for the examination of web fed rotary press printing conditions without interference with production equipment or production interruption.

More specifically, the invention contemplates the provision of a printing couple which is so regulable as to conditions of printing couple pressure and speed, printing paper, ink, packing, printing impression depth, and the like that substantial simulation of a desired press operating condition, or the determination of an optimum press operating condition may be advantageously effected.

In essence, the device of the invention, in a preferred embodiment thereof, includes an impression cylinder adapted to be packed, a printing plate cylinder having a peripheral opening therein, means for driving the said cylinders in pressed relation at subtsantially identical rotational speeds, a printing plate which is of the same arcuate contour as the printing cylinder and which is adapted to fill the peripheral opening of the printing cylinder, and a power operated device responsive to the action of a timing device to advance and retract the printing plate with respect to the opening of the printing cylinder. This mechanism is so provided that, in the practice of the method of the invention, the printing plate contacts the packed paper-carrying impression cylinder only once in the test operation regardless of the impression cylinder and printing cylinder speeds.

In this arrangement the printing couple carries a paper sheet securely on the packed impression cylinder and a band of ink on the printing plate; printing of the paper takes place under controlled conditions to relate the test results to production printing operations.

The pressure between the plate cylinder and packed impression cylinder in the preferred practice of the invention is subject to positive control and is attained by establishing a fixed impression setting between the cylinders. The impression cylinder blankets or packing on which the test paper is carried are impressioned by contact of the plate cylinder. In the packing of the impression cylinder with the blanket material, the initial and maximum impression figures plus the paper thickness are employed as a guide. Thus, similarly to production conditions, the normal impression setting will vary between 0.008 inch and 0.012 inch; however, overpacking of the impression cylinder may be as much as 0.020 inch which establishes the usual maximum impression available since gears of a production device normally bottom at this point.

The impression cylinder and plate cylinder may be positionable either manually or automatically after the paper sheet employed in the test is firmly locked on the impression cylinder. The adjustment for impression governs the clearance upon positioning of the plate and impression cylinders.

The printing cylinder and impression cylinder preferably have the same overall length and diameter, and the printing plate is suitably about ⅛ of the printing cylinder circumference.

The utilization of two cylinders will accommodate the testing procedures of many letterpress operations. For set-off considerations, and for offset printing evaluations, three cylinders, or four, are employed depending upon the nature of the variable or variables to which the test is directed. In any event the printing paper is subject to only one printed band in the course of the test, the apparatus being arranged to effect both printing plate and cylinder withdrawal in such manner that only one printing pass occurs in the course of operation of the device.

The printing plate itself is usually smooth surfaced and arranged to complete the plate cylinder periphery when in printing position. Conveniently, it extends very nearly the full width of the plate cylinder in order to provide an optimum printed band. The plate may, however, include various printing surfaces and be of a variety of materials; customarily, in testing in connection with newspaper usages, standard newspaper printing plate thickness is desirable and various thickness and types of base material may be employed to support printing plate thicknesses of less than stereoplate dimension. Likewise, the plate cylinder itself may be provided with a shell to represent the planographic aspect of the offset printing process.

Additionally, the inking systems may be automatic or manual as noted more in detail hereinafter.

Speed control is achieved with any convenient power source; primarily, rotational speeds of the cylinders are intended to simulate speeds achieved in production machines such as standard rotary newspaper presses.

The timing arrangement for the actuation of the power operated device carrying the printing plate itself may take any of several forms. Suitably, relay systems, the initial actuation of which is manual or automatic, are employed.

The invention will be more fully understood by reference to the following detailed description and accompanying drawings wherein:

FIG. 3 is a view partly in section and somewhat schematic of a printing cylinder similar to that of FIG. 1 together with associated printing cylinder mechanism;

FIG. 4 is a view similar to that of FIG. 3 illustrating a modification of the plate cylinder of the invention;

FIG. 5 is a view with parts broken away and partly in section of a printing couple having an alternative mode of operation for setting the printing couple impression;

FIG. 6 illustrates an apparatus arrangement in accordance with the invention particularly for effecting set-off and pick tests;

FIG. 7 illustrates an apparatus arrangement for effecting a variation of a pick test in accordance with the invention;

FIG. 10 is a view in side elevation of an embodiment of the invention which includes a novel inking system;

FIG. 11 is a schematic illustration of a control system useful in connection with the structure of FIG. 10;

FIG. 12 is a right end elevational view somewhat enlarged of a portion of the structure of FIG. 10;

FIG. 13 is an electrical circuit diagram useful in conjunction with the structural arrangements of FIGS. 10 to 12 inclusive;

FIG. 14 illustrates a modification of the control mechanism;

FIGS. 14a and 14b are diagrammatic representations illustrating the operation of portions of the structure of FIG. 14;

FIG. 15 is an electrical circuit diagram of the embodiment illustrated in FIG. 14;

FIG. 16 is a view of a plate cylinder which is undercut for the receipt of shell covers; and FIG. 17 is a view illustrating the retaining means for a stereotype section or other printing surface material on a printing head base.

In the drawings corresponding numerals where convenient designate similar parts.

Figure 1:
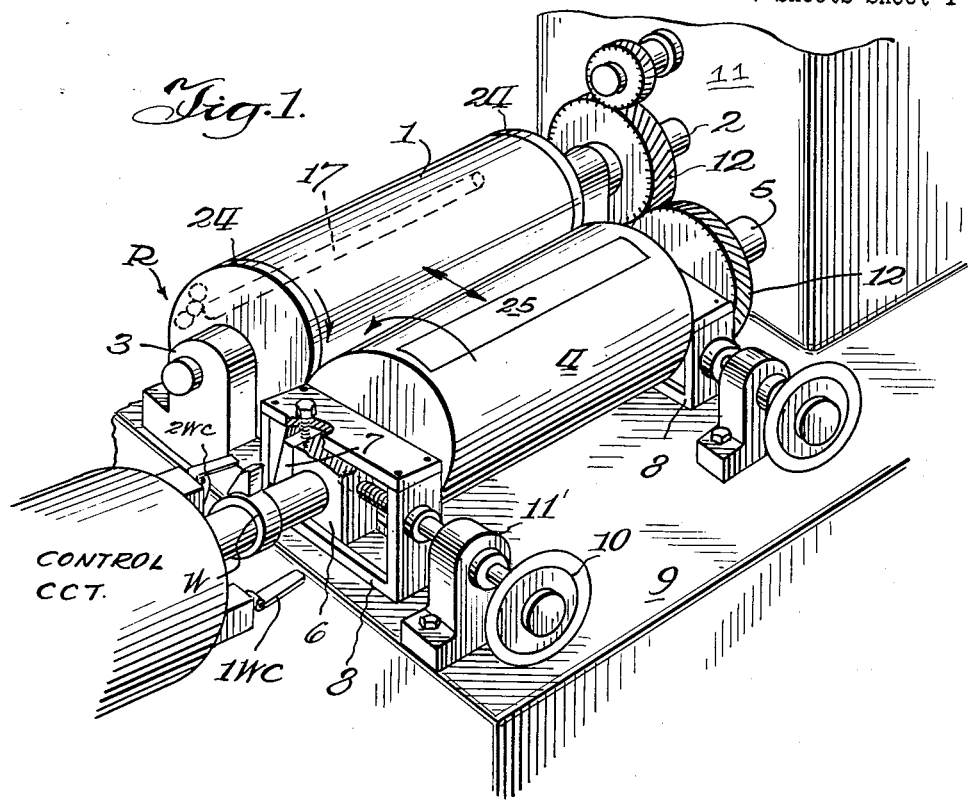
FIG. 1 is a view of a printing couple in accordance with the invention.
Figure 2:
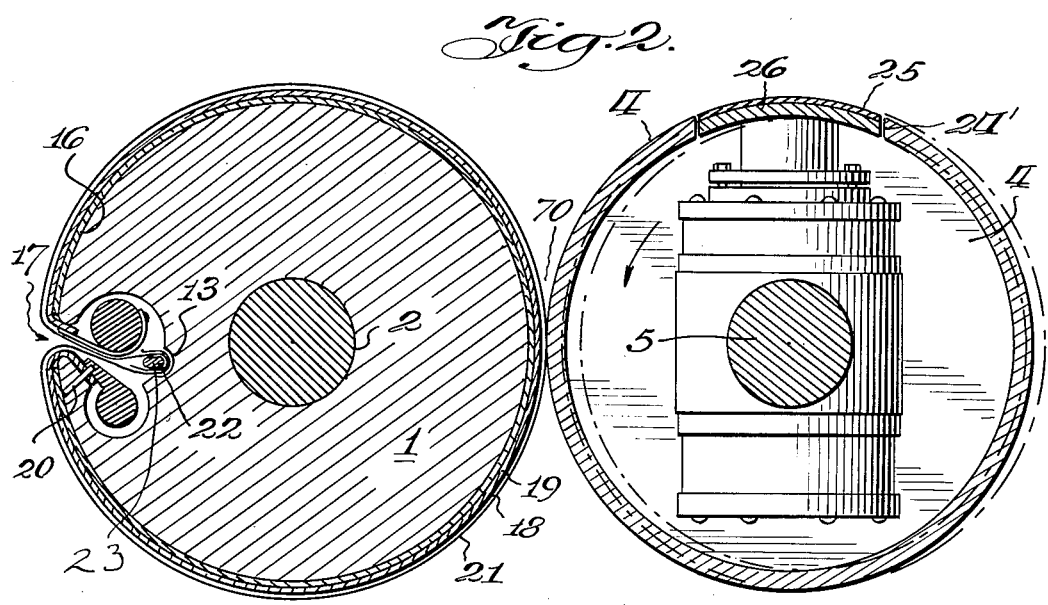
FIG. 2 is a somewhat enlarged view partially in section of the printing couple of FIG. 1.

Referring now to the drawings more in detail, and initially particularly to FIGS. 1 to 3 inclusive, the numeral 1 designates an impression cylinder supported fixedly on a rotatable shaft 2, which shaft is conveniently supported by a frame as at 3. As illustrated in FIG. 1, the impression cylinder is in operative relation with a plate cylinder 4.

Cylinder 4 is supported on rotatable shaft 5, which is carried on bearings 6, one of which is shown in FIG. 1. The bearing 6 and adjustment wedge 7 shown are slidably mounted in slide member 8. The slide members 8, one on each side of the device, are themselves fixedly mounted on support 9. Handwheels 10 have shafts which extend threadedly through the slide members into contact with the bearings 6 for engaging and positioning the plate cylinder shaft 5 against the wedges in their adjusted position. Such arrangement provides for impression control by the plate cylinder on the packed impression cylinder 1.

Shafts 2 and 5 carry respectively helical gears 12, one of which is adapted to be driven through a suitable gear and gear box arrangement 11; thus, with the gears 12 in engagement, the impression cylinder 1 and plate cylinder 4 are arranged to be driven at substantially identical rotational speeds. Since the position of the gears relatively to each other varies slightly with the impression, it is desirable to have the pitch line of the gears be at about the median point of the maximum impression in order to minimize speed variations above and below the speed desired. Thus, if the maximum impression is to be 0.010 inch, then the gear pitch would corespond to 0.005 impression position.

As shown more clearly in FIG. 2, there is incorporated within the periphery 16 of impression cylinder 1 a clamp which is designated generally at 17. This clamp is of conventional construction and retains a bottom blanket 18 and a top blanket 19. As also shown in FIG. 2, the top blanket 19 supports a sheet of paper 21. The sheet 21 is retained by the bar 23 and spring clamp 22 and is removable from the impression cylinder independently of the top and bottom blankets. The blankets and their customary tail extend from the rightward clamping portion clockwise (FIG. 1) around the periphery and have their usual perforated ends pinned as shown at 20; the bar 23 retains the paper in the clamp 22 and is itself removable for paper mounting, the cavity at 13 being contoured to inhibit bar movement.

The clamp 17, bar 23, and spring clamp 22 are operable through conventional ratchet mechanisms from a cylinder end as generally indicated at R in FIG. 1.

In the usual operation of the device the sheet 21 is subjected to printing with a band of ink transferred to the sheet from the plate cylinder 4. Subsequent to the application of the band of ink the rotation of the device is stopped, the plate cylinder separated from the impression cylinder, and the sheet removed from the impression cylinder for examination in accordance with customary inspections in the newsprint, bookpaper, or the like fields.

For the foregoing reason it is desirable that the sheet 21 be readily removable from the blankets 18, 19 without alteration of the blankets.

It will be appreciated that the foregoing arrangement permits simple attachment, removal, and replacement of paper for multiple testing. It will be further understood that blankets 18, 19 provide a somewhat resilient but relatively firm surface for the paper 21 serving to limit the yield of the paper under impact. The number, thickness and composition of the impression cylinder packing materials may, of course, be varied to approximate or duplicate existing press specifications within a laboratory or plant, or to investigate the effect of new packing materials as to the requirements of such materials with respect to the number of presses to be employed or the caliber and the quality of packing material composition. Thus the test device of this invention may be employed in determining optimum characteristics for such blankets in some uses of the structure of the invention; however, usually the blankets will be of conventional material such as is generally employed on commercial rotary press impression rolls when paper, ink, or operating conditions are the subject of test.

It is to be noted that this impression cylinder is suitably undercut across the major portion of its face to the extent of about 0.125 inch, the packing being drawn tight about the cylinder in the undercut area, the packing itself normally having a thickness of about 0.145 inch and therefore projecting about 0.020 inch beyond the impression cylinder periphery. The non-undercut extremities are designated at 24 in FIG. 1.

Referring again to FIG. 2, the plate cylinder 4 is not undercut, and it therefore represents a production printing cylinder with a plate attached thereto. As will be noted more particularly hereinafter, the plate cylinder 4, for the accomplishment of specific purposes of the test equipment, may be undercut. However, in the structure of FIG. 2, it is to be noted that, when the plate cylinder is in contact with the impression cylinder, there is uniformity of bearing surface between the cylinders, permitting positive control of nip pressure. In effect, the extent to which the undercut area of the impression cylinder is packed beyond the portions 24 determines the maximum available impression. Impression control is employed to establish the desired cylinder clearance and resultant printing pressure.

The plate cylinder 4 has a peripheral opening 24' which extends for a short distance around the periphery suitably about ⅛ of the circumference; opening 24' may extend substantially the full width of the cylinder as shown most clearly in FIG. 1 or over a portion of the length (FIG. 3). The former arrangement offers a maximum surface test area which is desirable although not necessary.

A printing plate 25 of stereotype or other material is adapted and arranged to close the opening 24' of printing plate cylinder 4. For this purpose the printing plate is fixedly and removably secured to a mounting panel 26 (FIG. 3) in the form of an enlarged flange portion of a piston 27. Countersunk bolts or other conventional fastening means (not shown) may retain plate 25 on panel 26. Piston 27 also includes a ram 28 mounted within a cylinder housing generally indicated at 29. Housing 29 includes a cylinder consisting of a bottom part 31, a cylindrical wall 32 slidingly engaged by ram 28, and a top cover 33. Circular recesses 34, 35 respectively formed in the bottom part 31 and top cover 33 receive and retain the wall 32.

The elements 31, 32, and 33 are bolted on mount 36 which is itself welded on or otherwise attached to shaft 5 for rotation therewith. Top cover 33 has a central cavity 37 and a circular projecting shoulder 38. A compressible O ring 39 in the cavity 37 forms a seal between the piston 27 and top cover 33. A gland 40 has a cylindrical bore through which it receives the piston 27 in the assembly of the device. Gland 40 includes a cylindrical portion 41 which compresses the O ring; gland 40 also includes a circular lip 42.

As already noted, an enlarged axial mount 36 which is affixed to shaft 5 receives and supports the bottom part 31. A similar bottom part 44 received on the mount 36 forms the base of a second and counterbalance air cylinder designated generally at 45. For this purpose, bottom part 44 has a circular recess 46 as does the counterbalance cover 47 at 48. A counterbalance cylindrical wall 49 is received in the circular recesses 46, 48 and is slidingly engaged by counterbalance piston 50, which piston is radially short but somewhat enlarged to compensate for the greater radial extension of piston 27. Additionally, the counterbalance air cylinder 45 includes a flush plug 51 and screw adjustment device 52 for achieving suitable adjustment in the counterbalance mechanism; adjustment of the screw relative to the flush plug permits dynamic balancing of the device for different sets of printing plates on the piston flange 26. The plate cylinder end plates are suitably removable from the cylindrical portion for access to the interior.

The shaft 5 is centrally bored to provide passage 54 which extends from one shaft end 55 well into the shaft axially. At shaft end 55 a coupling 56 has a fixed connector 57 and a movable connector 58, which latter communicates the passage 54 through supply line 59 with a suitable air supply; a pressure of 80 pounds per square inch gauge is suitable for such supply.

The inner end of passage 54 communicates with an air conduit 60 in which a solenoid control valve 61 is provided. Outlet branch conduits 62, 63 communicate respectively with the interiors of the cylindrical wall 32 and counterbalance cylindrical wall 49 through the bottom parts 31 and 44 as shown. Air flow through the conduits 62, 63 is as indicated by the arrows, to render the pistons and plate in operative printing position.

Branch conduits 64, 65 communicate respectively with the top cover 33 and counterbalance top cover 47, air flow being normally applied through these conduits in the direction indicated by the arrows and effective to retain the pistons inoperative and the printing plate retracted.

The solenoid valve 61 is controlled through electrical current supplied through insulated electrical leads 66, 67 which also pass through shaft 5 as shown; these leads are connected electrically by slip rings 68, 69 to a suitable power supply source. The solenoid valve is normally held by spring pressure or applied current through slip rings 68, 69 in such position as to supply air to the power operated device comprising the piston and cylinder carrying the printing plate. Application of control power to the slip rings in response to a control signal reverses the solenoid valve position and air flow to cause the plate to be moved to printing position.

In the operation of the device of FIGURES 1-3 inclusive for the purpose of testing a newsprint paper, the impression cylinder is packed in a standard manner with blankets 18 and 19 as shown and the paper is secured by spring clamp 22. The printing plate 25 is removed from mounting panel 26, inked and weighed. The plate is then returned to position on panel 26 and the plate retracted, in a manner to be described. Thereafter, the printing cylinder is positioned to form with the impression cylinder a pressure nip 70 as illustrated in FIG. 2. The pressure at this nip in pounds per inch squared in the testing of newsprint is commonly in the range of 360-720 pounds per square inch. Provision of the device of this invention permits the investigation of optimum production press conditions for given variables, including pressure, the nature of the paper, ink, machine speeds, and the like.

With the cylinders in pressed engagement and the printing plate 25 retracted, the couple is driven in rotation in the direction indicated by the arrows. A reasonable maximum printing press speed is 35,000 rotations per hour or 584 r.p.m. With a 15-inch diameter size plate cylinder and impression cylinder, the circumferential speed is about 38.2 feet per second and 1 rotation of the cylinders requires 0.103 second. With such an r.p.m. applied to printing plate cylinder 4 and impression cylinder 1, the time of traverse of the printing plate 25 when the plate is raised to printing position for ¼ of a cycle is approximately 0.026 second.

When the couple has attained its pre-determined speed, in the specific instance described of 584 r.p.m., the printing plate 25 is brought to operative printing position as it approaches the inlet of nip 70. Since the plate 25 is to be in printing position for only a portion of a cycle and since it is to print a single band across the paper, the timing of the printing plate movement is of considerable importance. Further, it is usually desirable that the printing take place diametrically opposite the clamp 17 of the impression cylinder; this latter may be achieved by initially positioning the clamp slot 180° from the nip 70 before engaging and starting the printing couple. When the gears 12 are engaged and with the positioning of the opening 24', as illustrated adjacent to or at the inlet of the nip 70 at the start of rotation, the printing will always take place opposite the clamp 17. This mode of operation will minimize any effect of "cylinder bounce" on test results; however, for evaluation of conditions at various areas around the printing cylinder circumference, the gears 12 may be so engaged as to provide for placing the printing surface ahead of, behind, or even intermediate the slot.

Figure 8:
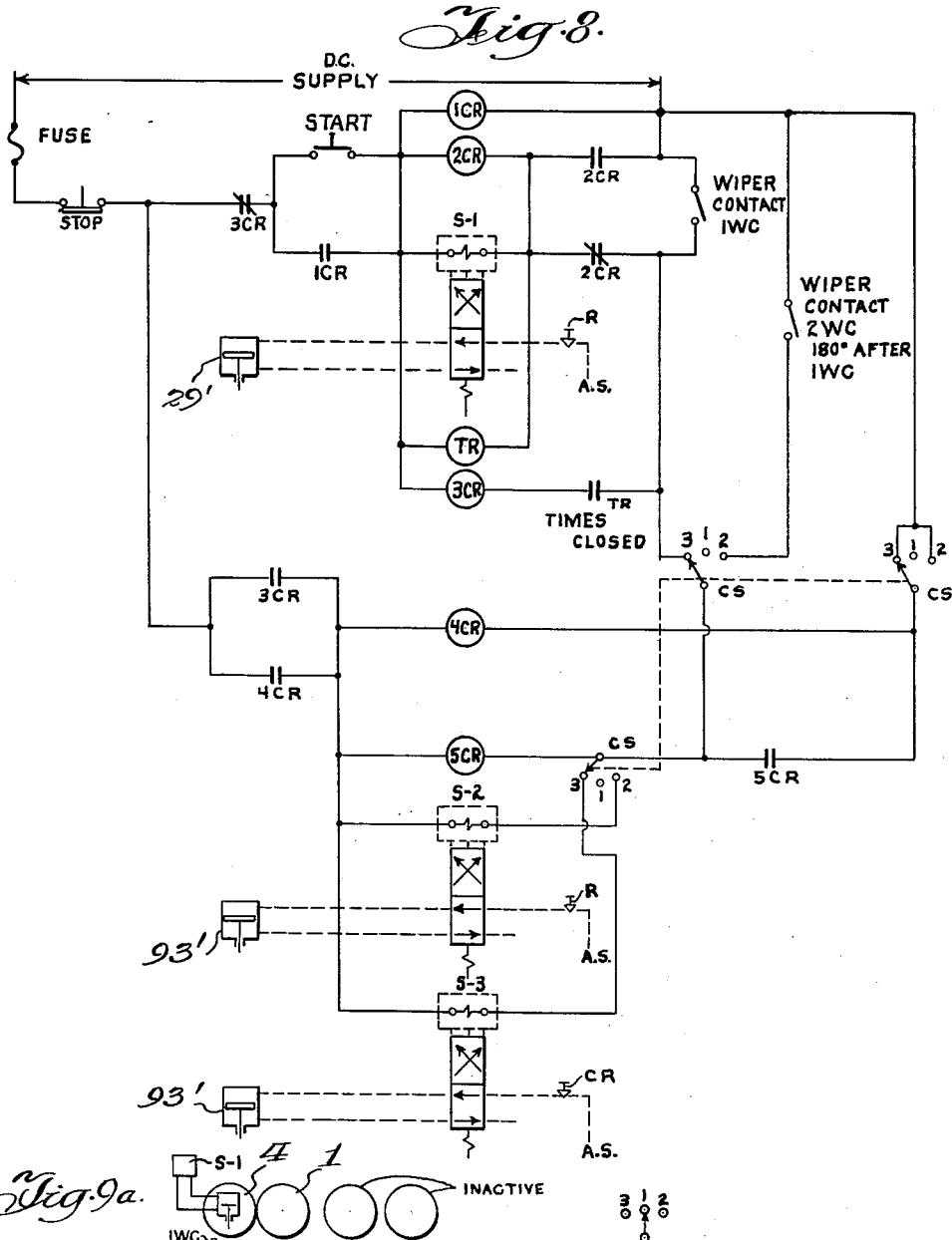
FIG. 8 is an electrical circuit diagram illustrating one mode of control of the structural arrangements of the preceding figures.

The timing device for actuating the solenoid 61 current supply at the appropriate position in the cycle of rotation may take any of several forms. One suitable arrangement to be discussed in detail hereinafter is illustrated in FIG. 8.

Referring particularly to the structure of FIG. 3, as signal current flows to the solenoid 61 under the influence of the timing device (FIG. 8) and through slip rings 68, 69, air is supplied through branch conduits 62 and 63 to move printing plate 25 to raised position and to actuate the counterbalance cylinder. The printing plate 25 has a very short radial movement, about 1/16 inch, as may be seen from the limited ram movement (FIG. 3); accordingly, it achieves position quickly under the influence of the air pressure. Other power operated devices may be employed to carry the printing plate to and from printing position.

The contact of the inked plate with the paper on the impression cylinder produces a printed band.

Shortly after the printing plate clears the nip 70, the timer device continues its action to cause plate withdrawal from the printing cylinder periphery. This is accomplished by removal of signal current from the solenoid 61 through the rotation of the shaft; such deenergization provides air flow through the conduits 64, 65 to effect retraction of the counterbalance piston as well as of the plate-carrying piston. Thus the paper is subjected to one impression only even though the rolls continue to rotate in contact.

The rotation of the impression and printing cylinders is then stopped, the printing cylinder is withdrawn to open the nip 70, and the paper is removed from the impression cylinder for examination. Also, the printing plate is removed from the panel 26 and weighed to determine the amount of ink transferred to the paper. The device is then ready immediately for another test operation.

The extent of transfer of ink to the paper is not of prime significance in many types of tests and, accordingly, the removal and weighing of the plates may then be eliminated. Particularly where the ink is applied mechanically, as discussed hereinafter, a calibrated quantity of ink may be transferred to the plate thus avoiding the necessity for the weighing operations.

In the description of the mode of operation set forth above, the plate 25 is, of course, carefully cleaned before subjection to the ink, and it should be again cleaned before use in a subsequent test.

In any event, as a result of the mode of operation described, information may be obtained as to the performance at various test speeds of the ink, paper, and packing, as well as the effect of operational variables such as print impression.

A modificaion of the embodiment of FIG. 3 is illustrated in FIG. 4. In this latter arrangement a lock is provided to retain the printing plate in raised position rigidly under the application of high nip pressures during the printing portion of the cycle. Thus, as shown, the mounting ring 36 includes upper and lower ears 71, 72 to which levers 73, 74 are respectively pivoted. Suitably, these pivots, as illustrated in FIG. 4 are eccentric to permit of adjustment.

Each of these levers is undercut forwardly at 75, 76 respectively to provide for secure engagement of the levers with the rearward projection 77, 78 of the plate-carrying panel 26. Further, each of the levers forwardly is pivotally carried by piston rods 79, 80 respectively of air cylinders 81, 82. These air cylinders communicate with the air supply of solenoid control valve 83 to permit retraction of the piston rods 79, 80 when the printing plate is to be withdrawn; retraction of the piston rods is against the bias of coil springs 84, 85 which normally force the levers 73, 74 respectively to locking position with the plate-carrying panel. With the locking arrangement described, appropriate counterbalance means are supplied to assure of rotational stability in operation of the test device.

In FIG. 5 an alternative and somewhat simplified arrangement is illustrated for setting impression. Spacer or gauge shims 53 are positioned between the fixed bearing support 3 carrying shaft 2 and cylinder 1 and the movable bearing block 6' carrying shaft 5 and cylinder 4. Adjustment by means of handle 10' moves the block 6' against the spacer shims 53 which are adjusted in number and thickness to provide the desired impression pressure between cylinders 1 and 4. Of course, the fewer the spacer shims of a given thickness, the greater the impression; spacer shims and the cooperating bearing housing extensions may be selected to give any desired impression.

Referring now to FIG. 6, an apparatus arrangement embodying the invention is illustrated and is adapted for the purpose of effecting set-off and pick tests and separately for the evaluation of offset printing factors. In FIG. 6 the plate cylinder 4 and impression cylinder 1 rotate in opposite rotational directions, as indicated by the arrows, and form the pressure nip 70. The initial setup of such arrangement, as thus far described, is as set forth in connection with FIG. 2. Additionally, however, there is provided in FIG. 6 a set-off cylinder 88 which forms a pressure nip 86 with impression cylinder 1 and which has its axis lying in the same plane as the axes of cylinders 1 and 4. This set-off cylinder 88 is identical to impression cylinder 1 as to packing, clamp, and the paper carried is the same as that on impression cylinder 1, as discussed in connection with FIGS. 1 and 2.

Set-off cylinder 88 is mounted on a shaft 89 which is supported in a wedge-bearing housing 90 which is itself movable as illustrated in the drawing. Thus, the bearing is carried on the end of a piston rod 91 of the piston 92 of air cylinder 93; the wedge serves as a stop in this instance. As illustrated in FIG. 6, air flow into the rightward end of cylinder 93 occasions movement of the shaft 89 leftwardly while air flow into the leftward end of cylinder 93 occasions movement of the shaft 89 rightwardly. The numeral 94 designates diagrammatically the control for effecting the engagement and disengagement of the set-off cylinder 88 from the impression cylinder 1.

As will be noted from FIG. 6, the plate cylinder is adapted to be driven from power take-off shaft 15 through the bevel gears 96 and the bevel gear 97. Helical gears as at 12 for FIG. 1 provide for direct drive between the impression cylinder shaft and the plate cylinder shaft, as already discussed.

Additionally, the set-off cylinder is driven through the cooperating bevel gears 98 and suitable gearing on the shaft 89 cooperating with the bevel gear 99. Coupling 100 is provided to permit disengagement of the set-off roll from the drive shaft. Universal joint 101 and spline 102 are provided to permit movement of the set-off roll 88.

Paper sheets carried on set-off cylinder 88 and the impression cylinder are removed from the cylinders as described in connection with impression cylinder 1. The sheets are then examined to determine the set-off or the amount of ink transferred from the ink band on the impression roll. Also, the paper may be examined for pick and rupture; this test is particularly important where coated papers such as those used in books and magazines are undergoing examination.

The basic three roll arrangement of FIG. 6 is also useful in the analysis of major variables in offset printing. For this purpose twin semicylindrical offset plate sections, one of which is cut out to provide a peripheral opening for the printing plate, are employed; the printing plate then receives a segment of an offset plate of equivalent size to the opening. A structural arrangement for the purpose is generally indicated in FIG. 16. In such usage the intermediate cylinder is a transfer cylinder, and the paper is carried in the third cylinder, which is packed in the same manner as the impression cylinder of offset presses.

The arrangement as illustrated in FIG. 7 is similar to that set forth in FIG. 6 but includes transfer cylinder 104 between the set-off cylinder 88 and the second or impression cylinder 1. Transfer cylinder 104 forms a pressure nip 105 with the cylinder 1 and a second pressure nip 106 with the cylinder 88. This transfer cylinder is identical in construction to the impression cylinder as is the set-off cylinder. No paper is carried on the transfer cylinder 104 but rather it is carried on the set-off cylinder. The operation is thus similar to that of the arrangement of FIG. 6 except that a more direct simulation of the set-off conditions in production operations is attained. In effect, the structure of FIG. 6 provides a more exaggerated presentation which is desirable for certain studies whereas the structural arrangement of FIG. 7 provides more specifically for operating evaluation of phenomena associated with printing problems. The drive arrangement for the transfer cylinder 104 is similar to that described for the cylinder 88 in connection with FIG. 6 and similar numerals identify the parts.

As may be noted from FIG. 1, a wiper contact 1WC is arranged to be engaged by wiper W in the rotation of shaft 5; this engagement governs the actuation of the printing plate to and from printing position. The precise realtive position of wiper W and contact 1WC need only be such as to limit the plate to one pass of the nip.

Figure 9A:
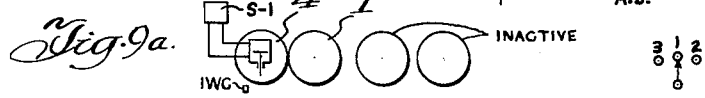
FIGS. 9a, 9b and 9c are diagrammatic representations illustrating the operation of the control circuit of FIG. 8.

Referring now to FIGS. 8, 9a, 9b, and 9c, the arrangement for control of the device as thus far described in each of its embodiments is more clearly set forth. Referring first specifically to FIG. 9a, it will be noted that the set-off and transfer cylinders are inactive in this situation while the impression cylinder 1 and the plate cylinder 4 are in rotative engagement as already described. Under this condition, and with the ganged control switches CS of FIG. 8 set to the No. 1 position, current is supplied to the electrical circuit from a D.C. source as indicated. With closure of the start button current is supplied through the fuse, the normally closed stop button, normally closed contacts 3CR of relay 3CR, the start button itself, the coil 1CR of relay 1CR, and the line. Energizing of coil 1CR closes the normally open contacts designated at 1CR and this maintains current flow through coil 1CR although the start button is released and opens. Accordingly, upon a first closure thereafter of the wiper contact 1WC (see also FIG. 1) a circuit is completed through the fuse, the normally closed stop switch contacts, the normally closed contacts designated at 3CR, the now closed contacts designated at 1CR, solenoid S-1, the normally closed contacts 2CR, wiper contact 1WC, and the line. Simultaneously, a circuit is completed through the stop switch contacts, the normally closed contacts 3CR, contacts 1CR, the coil 2CR, the normally closed contacts of relay 2CR, and the wiper contact 1WC to the line. Energization of the coil 2CR closes the normally open contacts 2CR, completing a circuit through the fuse, the stop switch, the normally closed contacts 3CR, contacts 1CR, the coil 2CR, the contacts 2CR and the line. Additionally, a series circuit is formed by the fuse, the stop switch, the normally closed contacts 3CR, the now closed contacts 1CR, the solenoid, the now closed contacts 2CR and the line. Thus the coil of solenoid No. S-1, which corresponds to solenoid 61 of FIG. 3, is energized and remains energized after wiper contact 1WC opens since a complete circuit exists through the normally open, now closed contacts 2CR.

Energizing of the solenoid S-1 actuates and reverses the solenoid valve between the air supply designated at AS and the air cylinder shown schematically in FIG. 8 at 29', the air cylinder being similar to the cylinder 29 of FIG. 3. The solenoid valve is itself suitably a two position, three connection directional valve. Since wiper contact 1WC is positioned in advance of the nip 70 (about 135°, FIG. 9a), the plate of the cylinder is raised as it approaches the nip 70 by the activation of air cylinder 29', as indicated in FIG. 8. As cylinder 4 continues to rotate, the plate remains extended and printing takes place.

Simultaneously with the energizing of S-1, the coil TR of a time delay relay is actuated and is maintained actuated through the circuit from the fuse, the stop button, the normally closed contacts 3CR, the now closed contacts 1CR, the coil TR, the normally open now closed contacts 2CR, and the line; this relay times the normally open contacts TR to a closed position. Thus, as the wiper contact 1WC returns to its closed position for the second time, a circuit is completed through the fuse, the stop switch, the normally closed contacts 3CR, the now closed contacts 1CR, the coil 3CR, the now closed contacts TR, and the wiper contact 1WC to the line. This causes the normally closed contacts 3CR to open, thus de-energizing relay 1CR, relay 2CR, time delay relay TR, and thereby opening the circuit to the coil of solenoid S-1, permitting the solenoid valve to return to its original position; this reverses the air pressure to cylinder 29' in such manner as to withdraw the plate 25 from the periphery of cylinder 4. Since control switch CS is in position 1, relay 4CR, relay 5CR, and solenoids S-2 and S-3 are not energized.

The relays of the circuit of FIG. 8 may be conventional relatively high speed quick relays having an actuation time of about 0.003 second. Such are suitable in intermediate speed ranges of the cylinders; for the higher speeds of about 584 r.p.m. switching relays having an actuation time of about 0.001 second are preferred; such relays are commercially available and are achieved by a special and careful design of the magnetic circuit and contact assemblies. Coil inductance in such relays is reduced by reducing the $L/R$ time constant. Relays of this type are commonly employed in telemetering, analog and digital computers.

Accordingly, the exact mechanical and electrical arrangement is dependent upon the specific purpose for which the test equipment is designed. As already noted, in newspaper work current maximum speed is about 584 r.p.m.

The wiper W in the position of FIG. 8 thus described is suitably positioned in advance of the nip at least 90° and not more than 180°. When only two cylinders are employed, this wiper may be positioned cloesly adjacent the outlet side of the nip; however, when the same wiper is to serve for the actuation of the mechanism shown in FIG. 9b, now to be described, it is desirable that the wiper be somewhat less than 180° around the roll from the inlet side of the nip.

Figure 9B:
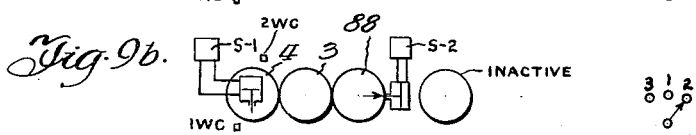

In FIG. 9b, three rolls are illustrated as in active position. These are the rolls 4, 1 and 88 (FIG. 6). The operation of the circuit in FIG. 8 is then similar to that described in connection with FIG. 9a insofar as the operation of solenoid S-1 is concerned. However, with the ganged control switch CS in the second position, the normally open contacts 3CR will be closed with current flow through the coil 3CR. Closing of the normally open contacts of the relay 3CR completes a circuit through the fuse, the stop switch, the normally open contacts of 3CR, the coil of relay 4CR, one side of the control switch CS at position 2 and the line. Energizing relay 4CR closes normally open contacts 4CR and maintains this relay 4CR closed when relay 3CR de-energizes opening the normally open contacts 3CR.

The current flow through the coil 4CR as noted closes the normally open contacts at 4CR, thus completing, when wiper 2WC closes, a circuit through the fuse, the stop switch, the normally open contacts of 4CR now closed, the coil of the relay 5CR, contact two of the control switch CS, and the wiper contact 2WC when the latter is closed. This latter circuit is thus completed 180° after the circuit is completed for plate withdrawal.

Simultaneously, with the flow of current through the coil 5CR a circuit is completed through the fuse, stop switch, the now closed normally open contacts 4CR, the coil of the solenoid S-2, the control switch, and the now closed contacts 5CR to the line through the right hand terminal of the control switch CS. The energizing of the solenoid S-2 reverses air flow to the cylinder 93', which corresponds to cylinder 93 of FIG. 6, in such manner as to affect withdrawal of the cylinder 88.

Since this latter withdrawal takes place at a period after which the cylinder 4 has rotated more than 180° from its printing position, the band will have been transferred from the cylinder 4 to the roll 1 and to the cylinder 88 prior to withdrawal of the latter roll.

After withdrawal of the cylinder 88 from its contact position with the cylinder 1 (FIG. 9b) the stop switch may be manually operated to open the circuit; thereafter, the rotation of cylinders 1 and 4 is stopped and the test paper is removed and examined in accordance with customary practices.

Figure 9C:
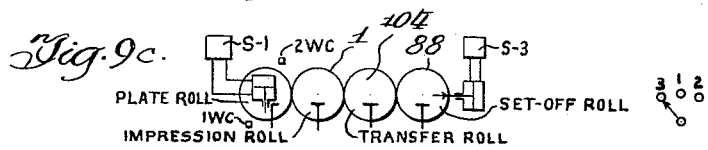

When four rolls are employed as shown in FIG. 9c, only wiper contact 1WC is required. When the four-roll system is employed, the ganged control switch CS is in the No. 3 position (FIG. 9c). Under this circumstance, the solenoid S-2 will not be energized. However, solenoid S-3 will be energized after three revolutions of cylinder 4 have been made. Solenoid S-3 is energized when the normally open contacts 4CR are closed in the manner already described in connection with FIG. 9b. The circuit through the solenoid S-3 is completed through the fuse, the stop switch, the now closed normally open contacts 4CR, the coil of solenoid S-3, the No. 3 contacts of the control switch CS, and the line through the wiper contact 1WC when the latter is closed for the third time. Simultaneously, coil 5CR is energized closing the normally open contacts 5CR and maintaining power in solenoid S-3 when wiper 1WC opens. Upon withdrawal of the set-off roll 88 (FIG. 7) from the transfer roll 104 due to the actuation of solenoid S-3, the stop switch is opened, the rotation of the rolls stopped, and the paper may be examined in the customary manner. Opening the stop switch clears the circuit.

In connection with FIGS. 1 through 7 and FIGS. 9a, 9b, and 9c, it is to be noted that the cylinder of the system which carries the movable plate is normally termed the plate cylinder in the art; other cylinders may vary in designation depending upon the printing process used and also upon the specific type of test being conducted. Thus, in letterpress evaluations, the cylinder adjacent the plate cylinder is always the impression cylinder. However, in offset printing evaluations, the cylinder adjacent the plate cylinder would normally be termed a transfer cylinder and the third cylinder in line as at 88 in FIG. 9b would be termed the impression cylinder since it carries the paper. The fourth cylinder in line (FIG. 9c) would normally have a variety of titles depending upon the test objective—set-off cylinder, pack cylinder, sheet rupture cylinder, and the like. In the appended claims the plate cylinder is commonly termed the second cylinder, the others being designated first, third and fourth cylinder.

Further, the cylinders all have substantially the same surface speed in feet per minute and preferably are all of the same diameter so that the rotational speeds are also the same.

Referring now to FIGS. 10, 11 and 12, an automatic arrangement for the inking of the plate 25 is illustrated. For this purpose the impression cylinder and the plate cylinder 4 are stationary. Referring first to FIGS. 10 and 12, there is indicated at 112 and 114 cooperating driven fountain rolls which receive in the nip thereof ink from a manually operated measuring device 116. A transfer and oscillating roll 118 is in rotatable contact with the roll 114 and is itself contacted by a form roller 120. All of the rolls 112, 114, 118, and 120 are driven in rotation in the direction indicated by the arrows at similar speeds through a suitable motor drive indicated in the circuit of FIG. 13. Suitably also, these rolls are all provided with a polyurethane surface for easy and complete cleaning. The transfer roll 118 serves to convey ink from the fountain roll 114 to the form roll 120; for the purpose of effecting uniform transfer, roll 118 is arranged for recipocation as designated by the arrow in FIG. 12. Since such arrangement is conventional, mechanism for effecting the reciprocation while the roll rotates is not specifically illustrated.

The form roll 120 is arranged to be carried to the surface of the plate 25 and to rotate while being carried across the surface for the purpose of effecting uniform inking of plate 25. The form roll is itself preferably of greater circumference than plate width to aid in attainment of a uniform ink film. One form of mechanism for achieving this is illustrated in FIG. 11. As shown in the latter figure, the roll 120 is carried rotatably on the end of the piston rod 121 which is itself secured to the piston 122, the piston being housed in air cylinder 123. Air is supplied to the air cylinder 123 to the upper end of piston 122 through conduit 124, the return line being open to the atmosphere and designated at 125; the return is, of course, closed when air is supplied through conduit 124. Air is also supplied to the bottom of the air cylinder 123 through the conduit 126, the return conduit to atmosphere being designated at 127 and closed when conduit 126 is supplying air. The air cylinder 123 is itself carried on arm 129 which is pivoted to the shaft 5 of roll 4. The arm 129 also mounts a slide 130 carried in slide way 131. Piston rod 132 of piston 133 which is itself housed in cylinder 134 is secured to the slide 130. The cylinder 134 is pivoted at 135 to a suitable frame 136. Accordingly, this latter arrangement provides an adjustable stroke for movement of the form roll 120. Air is supplied the left hand of the air cylinder 134 through conduit 140, the return line to atmosphere being designated at 143 and closed when conduit 140 is open. Air is supplied to the right end of air cylinder 134 through a conduit 138, the return line to atmosphere being designated at 139 and closed when conduit 138 is open. FIG. 13 illustrates the manner in which the structure 10 to 12 inclusive is controlled.

Normally contacts TR–1 of FIG. 13 are closed and the air supply retains the inking roll 120 retracted at the start of an operation. As illustrated in FIG. 13, a source of D.C. current upon closure of the start button is effective to complete a circuit through the fuse, the limit switch LS, the start button itself and the coil of relay CR; this closes the normally open contacts CR and current is applied to the motor M through the normally closed contacts to cause rotation of the rolls of the inking system. The relay CR contacts are retained closed by current flow in coil CR after the start button is released. Simultaneously with motor energization, the coil TR–1 of a time delay relay is energized and power is also supplied to the coils of power solenoids PS–1 and PS–2 through contacts TR–1. The time delay relay TR–1 is effective to delay the operation of the air control system for a period sufficient to permit adequate and uniform inking of the form roll 120. At the expiration of the time delay the normally closed contacts TR–1 are opened thus preventing current flow through the coil of pressure solenoid PS–1; simultaneously, current flow through the coil of travel solenoid PS–2 is cut off. The de-energizing of the coil of solenoid PS–1 causes the form roll 120 to be carried to the surface of the plate 25 since air now flows through conduit 124 and the flow control valve 141 to the upper end of the air cylinder 123. Also, air flows to the left hand end of the cylinder 134, thus causing the form roll 120 to travel across the plate 125.

Needle valve 142 (FIG. 13) limits the rate of air flow from the supply to the cylinder 134 thus permitting firm contact of the form roller with the plate 25 at the start of the operation.

As will be clear from the FIG. 11, when the form roll reaches its right hand extremity, the limit switch LS is opened (FIG. 13) and the circuit is inactivated. This de-energizes the relay CR and motor M and again closes the contacts TR–1; the limit switch LS is biased to a circuit closed position and accordingly, the coils of solenoids PS–1 and PS–2 are again energized. This restores the original pressure conditions to the cylinders 123 and 134 as the form roller returns to the solid line position of FIG. 10. Thus, there has been described an automatic system for effecting inking of the plate of the plate cylinder prior to the start of an operation. It will be understood, however, that manual inking may be employed as already described, and that, in either event, all rolls should be thoroughly cleaned before and after an operation. Further, in offset print testing, water may be applied to a printing surface manually, prior to an inking cycle, in order to incorporate within the test both printing material variables of the offset process.

An alternative method of actuating the plate cylinder is illustrated in FIG. 14, the electrical circuit therefor being set out in FIG. 15. As shown, a valve actuator shaft 148 is slidably mounted with a rotary element 149 of an air valve 150. The actuator shaft carries a first cam 151 spaced at 90° around the circumference of actuator shaft 148 from a second cam 153. The air valve 150 has an inlet port 154 and a pair of outlet ports 155 and 156. The rotary element 149 is adapted upon actuation through the cam elements 151 or 153 to connect the inlet port 154 respectively with outlets 155 or 156.

The actuator shaft 148 and the valve 150 itself are slidably mounted to bring the cam elements 151 and 153 into engagement with an actuating lug 157 carried on shaft extremity 5 of the plate cylinder 4. Lug 157 is sufficiently wide to permit its alternate engagement with each of the spaced cams 151 and 153 when the latter are appropriately rotatably positioned. To draw the actuator shaft into position, a wiper contact as described in connection with FIG. 1 is employed.

As will be noted from the circuit (FIG. 15) for two-roll operation, closure of the start button completes a circuit through the fuse, the stop switch, the normally closed contacts 2TR, the start button itself, the coil of relay 11CR and the line. Current flow through the coil 11CR closes the normally open contacts of relay 11CR, maintaining the relay energized when the start button is released; thus, when the wiper W1 closes, a circuit is completed through the fuse, the stop switch, the norcally closed contacts 2TR, the now closed contacts 11CR, the coil of solenoid S–4, the normally closed contacts 12CR, and the wiper contacts W1 to the line when the wiper closes. Also, a circuit is completed through now closed contacts 11CR, the coil of relay 12CR, and the normally open now closed contacts 12CR to the line. Current flow through the now closed normally open contacts 12CR thus provides a completed circuit through S-4 when the wiper contacts are opened. Accordingly, current flow through the coil of relay S-4 continues and the actuator 148, symbolized in FIG. 15, is drawn into position for engagement by the actuating lug 157 to which reference has already been made. Accordingly, in the rotation of the plate roll 4 the cam 151 will be contacted by the lug 157 and the element 149 will be rotated to such position as to communicate the inlet port 154 with the outlet port 156 (FIG. 14b). This supplies air to the plate cylinder 29' causing the plate to be raised to printing position. Further, the cam 153 is now in position to be contacted by the lug 157 in the next rotation of the device. Accordingly, after the plate cylinder has been raised and printing has taken place, the lug 157 engages cam 153, rotating the element 149 to 90° from its former position and closing off the outlet 156 from the inlet 154. Simultaneously, the outlet 155 is placed in communication with the inlet 154 and air flow is reversed to the air cylinder 29' in such manner as to retract the plate.

The timing relay 2TR which is set to provide a time delay less than that required for a complete revolution of the cylinder is energized at the time that the coil of solenoid S-4 conducts and remains energized through the normally open but now closed contacts 12CR. At the end of the time delay the time relay opens the normally closed contacts 2TR. This opens the circuit and de-energizes relays 11CR, 12CR, solenoid S-4, and, of course, time delay relay 2TR itself; thereafter the rotation of the two rolls may be stopped and the paper examined in the manner already described.

In instances where three rolls are employed, the ganged control switch CS-1 is placed in the No. 2 position (FIG. 15). Under this circumstance, simultaneously with the opening of the normally closed contacts 2TR, the normally opened contacts 2TR are closed and a circuit is completed through the fuse, the stop switch, the normally open but now closed contacts 2TR, the coil of relay 13CR, switch contact 2, and the wiper W-2 when this wiper closes. Simultaneously, the coil of solenoid S-6 is placed in circuit and the solenoid actuated to apply air to effect withdrawal of the set-off cylinder 88 in a manner already described in connection with FIG. 9b. After the opening of the wiper W-2, the circuit through S-6 is maintained completed through the now closed normally open contacts 13CR which have been closed by conduction of relay coil 13CR; in this instance the circuit is completed through the right hand contact 2 (FIG. 15).

When four rolls are employed as illustrated in FIG. 9c, the closing of the normally open contacts 2TR effects current conduction upon closure of W-1 for the third time by the coil of solenoid S-5, thus applying air pressure to the fourth cylinder in the manner already described. For this purpose the ganged switch CS-1 is in the No. 3 position. Energizing 13CR closes the normally open contacts 13CR to maintain power on relay 13CR and solenoid S-5 when W-1 opens. Operation of S-5 reverses the air flow to cylinder 93' removing the set-off roll from the transfer roll (FIG. 9c).

The arrangement of FIGS. 14 and 15 permits the elimination of some relays. It is also to be noted in this connection that the solenoid for control of the raising and lowering of the plate cylinder may be positioned outside of the cylinder, thus rendering it somewhat more accessible for servicing. However, proximity of the solenoid to the air cylinder is desirable for optimum quick action of the printing plate.

Referring now to FIG. 16, a modified plate cylinder is illustrated. This latter arrangement permits controlling the extent and the kind of surface area of the plate cylinder which may be in instantaneous contact with the impression cylinder. To achieve this the plate cylinder is undercut to an extent to permit a shell to be attached around the periphery of the plate cylinder. Thus, as seen in FIG. 16, the plate cylinder designated 160 is undercut to receive a shell 161 which is in two halves designated at 161A and 161B. Bolts 162 retain the shell halves in position. One shell is cut out at 163 to provide for the raising of the plate. Also, the plate cylinder edges at 165 are undercut by approximately 0.024 inch, to allow absolute control of contact area.

The surface of the shells may be etched to simulate a desired printing plate condition. For example, solids, half-tones, or a combination of these may be the test objective. The shell itself may be of zinc, magnesium, or a metallic alloy. A smooth zinc shell is useful where maximum contact area between the impression cylinder and the inked plate is desired.

Control of the printing plate surface is desirable since printing pressure is created by the fixed clearance of the impression and printing plate cylinders rather than by the application of specific pressure. Accordingly, the amount of total pressure in a print test is dependent on the surface area of contact, the resiliency of the pressure cylinder packing, rigidity of the cylinder and their bearings, individual areas of contact between the surfaces, and the like. By the arrangement described, the surface conformation of the plate is enabled to be altered. The printing plate itself in the arrangement set forth in FIG. 16 is suitably adjustable to permit plate level variation of printing quality and outlet maintenance of desired printing height.

FIG. 17 illustrates one mode of securing a zinc or other plate material to the printing base and print head. As shown in the drawing, the zinc plate 169 is confined between the base 170 and the clips 171 which are themselves suitably bolted to the printing head base 172. In general, the total thickness of the arrangement illustrated in FIG. 17 is about 0.4375 inch corresponding to production situations in the newspaper field.

The overall structural arrangements described hereinbefore may, of course, be modified to provide for specific test situations. For specific requirements, cylinder widths, impression control, motor size, power train, and frame rigidity might readily be altered. In general, duplication of substantially all dynamic variables encountered in production of web fed rotary presses is contemplated. Production conditions are readily duplicated as to packing impression depth, production machine speed, and production type inks as already noted. The instantaneous impression pressure relationships of production factors are duplicated since other conditions are substantially identical. Additionally, coated papers may be tested for pick resistance and rupture strength.

Provision may be made for auxiliary apparatus such as electrical heaters within the cylinders for evaluation of temperature in relation to ink penetration, ink absorption or oxidation and resultant set-off characteristics. Also, strain gauges might be incorporated in studies in printing pressures.

In operational tests usually the quality of the printing result is the prime concern; in such instances the quantity of ink transferred to the printing surface may be determined empirically with respect to pressures. It is to be noted that pressures in offset printing are generally less than for letterpress. Therefore, pressure is less critical in this area.

While primarily in the foregoing description the adjustment of impression by altering cylinder clearance with a pre-determined impression cylinder packing has been emphasized for use in examination of rotary newspaper press operations, the system might be employed where metal-to-metal bearers, as is common in the commercial printing field, for example bookpaper printing, are encountered.

Usually such bearers are employed where there are long runs of high quality printing on high quality paper. In such instances underlaying of the impression cylinder packing, as well as support underlaying in particular plate areas, is utilized to provide for attainment of desired printing pressures.

It is to be noted that when an impression cylinder is overpacked by 0.020 inch, a circumferential differential exists between the plate cylinder and the impression cylinder; this is standard procedure in the newspaper printing field. For laboratory purposes in general testing an overpacking of 0.012 to 0.015 is considered sufficient.

The evaluation of prints is a subsequent procedure and the device of the invention derives a major portion of its value from the fact that substantially operational prints may be obtained in a laboratory without the necessity of extensive field travel, pressroom shutdown, and the like.

In the appended claims the ink transferred from the printing plate is commonly referred to as a band of ink; it will be understood the precise nature of this band will vary with the nature of the printing surface of the plate from a uniform and complete inked surface to a surface having interrupted printing areas within limits corresponding to plate width and length.

It will be understood that this invention is susceptible to modification in order to adapt to different usages and conditions and, accordingly, it is desired to comprehend such modifications within the invention as may fall within the scope of the appended claims.

What is claimed is:

1. The method of rotary print testing which comprises the steps of:
   (a) securing a sheet to be test printed to a first cylinder,
   (b) forming a printing pressure nip between said first cylinder and a second cylinder having a retracted printing plate,
   (c) driving the said cylinders as a couple and in pressed relation with the printing plate inked but retracted from printing position,
   (d) driving the said cylinders in the pressed relation to attain a pre-determined test speed,
   (e) exposing said sheet to said printing plate by raising said printing plate to printing position as the cylinders rotate in the pressed relation at test speed,
   (f) limiting the exposure of said sheet to one contact with said printing plate by retracting said printing plate after the plate once passes said printing nip,
   (g) subsequently stopping the rotation of the cylinders and withdrawing the cylinders from the pressed relation, and
   (h) removing the sheet for examination.

2. In a rotary print test device, in combination: a rotary couple forming a printing nip and including a first cylinder having retaining means for a sheet to be printed in said printing nip and a second cylinder having a printing plate which is normally recessed from printing position; means for effecting continuous driving of said printing couple in rotation at a pre-determined test speed; power operated means connected to said printing plate for moving said plate to and from printing position; and means including means governed by the rotation of the cylinders to cycle the actuation of said power operated means such that at said pre-determined test speed said printing plate is in printing position for only one pass of said printing nip, said power operated device being reversibly operable and normally retaining said printing plate recessed.

3. A rotary print test device comprising a first cylinder adapted for retaining about said cylinder a sheet to be printed, a second cylinder having a printing plate which is normally recessed from printing position, said second cylinder engaging against and forming with said first cylinder a printing nip, power operated means including a piston and fluid cylinder within the said second cylinder, said printing plate being carried by said piston for movement to and from printing position, reversing control means for applying power to said power operated means to retain said printing plate retracted and for reversing the application of power to move said printing plate to printing position, means for effecting continuous driving of said cylinders in rotation at a predetermined test speed, and means including means governed by the rotation of the cylinders for effecting reversal of said reversing control means.

4. In combination, in a rotary print test device, a print cylinder having a printing plate, said print cylinder including an axially extending peripheral slot into which said printing plate recesses, a fluid cylinder-piston combination supported within said cylinder, said piston extending generally radially and supporting said printing plate for movement into said slot to complete the cylinder periphery, a solenoid controlled valve, means communicating said solenoid controlled valve with said fluid cylinder-piston for the reversible application of fluid through said valve to said cylinder, and counterbalance means within said cylinder also comprising a fluid cylinder-piston combination in communication with said valve.

5. In a rotary print test device, a plurality of cylinders having their axes in parallel alignment in a common plane and said cylinders forming pressure nips, one of said cylinders serving as an impression cylinder, another of said cylinders serving as a plate cylinder, and a third one of said cylinders serving as a transfer cylinder, said plate cylinder having a printing plate which is normally recessed from printing position and said impression cylinder having means for removably securing therearound a sheet to be printed; means for effecting continuous driving of said plurality of cylinders in rotation at a pre-determined test speed; first power operated means connected to said printing plate for moving said printing plate to and from printing position; other reversibly operable power operated means retaining said impression cylinder in position to form one of said pressure nips with an adjacent transfer cylinder; and means to cycle the actuation of said first and said other power operated means successively at said pre-determined test speed such that said printing plate is in printing position for only one pass of said printing nip and said impression cylinder is withdrawn from said nip position after said sheet receives one print impression.

6. In a rotary print test device a plurality of cylinders having their axes in parallel alignment in a common plane and said cylinders forming pressure nips, a first one of said cylinders serving as an impression cylinder and another of said cylinders serving as a plate cylinder, at least two intermediate transfer cylinders being between said plate and impression cylinders, said plate cylinder having a printing plate which is normally recessed from printing position and said impression cylinder and an adjacent transfer cylinder each being adapted for removably securing therearound a sheet to be printed; means for effecting continuous driving of said plurality of cylinders in rotation at a pre-determined test speed; first power operated means connected to said printing plate for moving said printing plate to and from printing position; other and reversibly operable power operated means retaining said cylinders in position to form said pressure nips; means to cycle said printing plate to and from printing position at said pre-determined test speed; and means controlled by the actuation of said last said means to actuate said reversible operable power means after one complete rotation of the impression cylinder to separate said impression cylinder from its adjacent transfer cylinder.

References Cited in the file of this patent

UNITED STATES PATENTS

| | | |
|---|---|---|
| 580,470 | Schwarzschild | Apr. 13, 1897 |
| 1,238,325 | Parmelee | Aug. 28, 1917 |
| 2,421,823 | Allen et al. | June 10, 1947 |
| 2,980,014 | Bonsch | Apr. 18, 1961 |